United States Patent [19]

Eigenmann

[11] 4,071,384
[45] Jan. 31, 1978

[54] METHOD AND DEVICES FOR ROAD SURFACE MARKING

[76] Inventor: Ludwig Eigenmann, Vacallo, Ticino, Switzerland

[21] Appl. No.: 740,850

[22] Filed: Nov. 11, 1976

Related U.S. Application Data

[63] Continuation-in-part of Ser. No. 652,253, Jan. 26, 1976.

[30] Foreign Application Priority Data

Jan. 24, 1975 Italy .................................. 19573/75
Nov. 12, 1975 Italy .................................. 29203/75

[51] Int. Cl.$^2$ .......................................... E01C 23/16
[52] U.S. Cl. .................................... 156/71; 118/202; 156/499; 156/547; 401/1; 401/137; 404/79; 404/94; 427/138
[58] Field of Search ............... 156/71, 499, 547; 404/72, 79, 94; 401/1, 136, 79, 83, 137; 427/136, 138; 118/202

[56] References Cited

U.S. PATENT DOCUMENTS

| | | | |
|---|---|---|---|
| 2,043,188 | 6/1936 | Walten ........................ | 401/2 |
| 3,376,850 | 4/1968 | Pierce ........................ | 118/202 |
| 3,682,054 | 8/1972 | MacPhail et al. ............ | 404/94 |
| 3,844,668 | 10/1974 | Winters et al. ............... | 404/72 |
| 3,844,669 | 10/1974 | Eigenmann ................... | 404/94 |
| 3,902,939 | 9/1975 | Eigenmann ................... | 156/71 |

*Primary Examiner*—Edward G. Whitby
*Attorney, Agent, or Firm*—Michael J. Striker

[57] ABSTRACT

There is described a method for road surface marking with tape material, including the steps of applying a thin layer of an essentially liquid hydrophilous wetting agent on said surface, of forming an essentially bituminous primer layer thereon, and then pressingly laying a prefabricated tape material on said primer layer, such being formed with an essentially thermoplastic composition containing at least 60 % by weight of solid thermoplastic substances fluidified for intimately contacting the road surface, capable of fastly solidify at least to $10^3 - 10^4$ cP for receiving the tape material, then up to at least $10^5$ cP to provide a bond of the tape to said surface capable to resist to horizontal stress of at least 1.5 kg/cm within 30 seconds, and further harden at ambient temperature to resist to a stress of at least 3 kg/cm. There are also described devices for applying such composition and tape and for melting the said solid thermoplastic substances.

10 Claims, 8 Drawing Figures

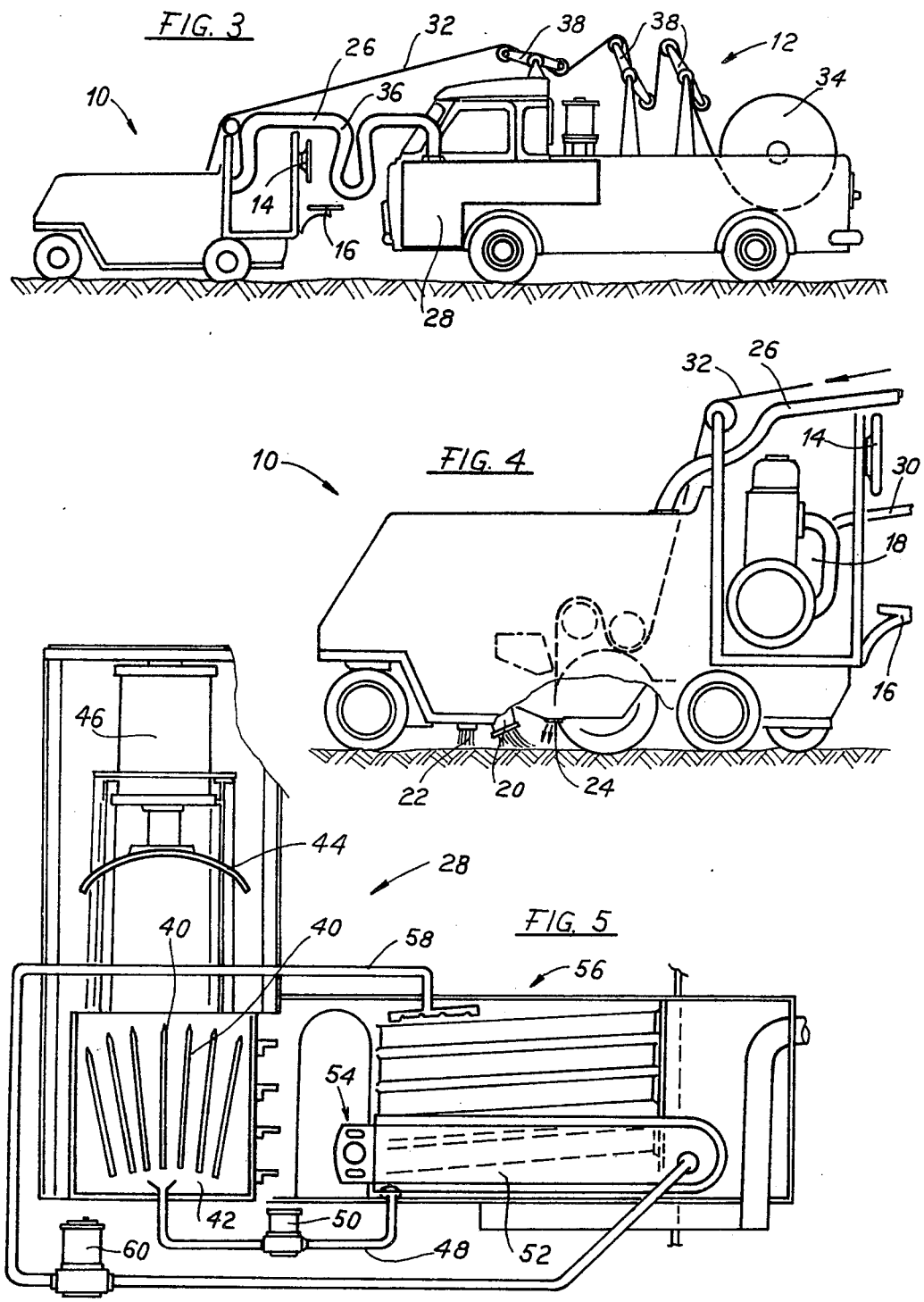

METHOD AND DEVICES FOR ROAD SURFACE MARKING

CROSS-REFERENCE TO RELATED APPLICATION

This application is a continuation-in-part of my prior application Ser. No. 652,523, filed Jan. 26, 1976 and whose entire disclosure is incorporated herewith by reference.

BACKGROUND OF THE INVENTION

1. Field of the invention

This invention is generally concerned with the art of road and highway marking with strip or tape material, namely for providing a road or highway with centrelines or with traffic lane-dividing lines or the like, prevailingly but not exclusively arranged lengthwise of the road.

More particularly, the present invention is concerned with the art of providing traffic signs of the above type, consisting of prefabricated tape material laid on the road surface upon a relatively thin underlayer generally comprising bitumen or asphalt or the like, capable of providing a tape material receiving impervious, flat and planar surface, and securing a firm and permanent bond of the tape material to the road pavement.

Such underlayer is generally and usually indicated, in the art of road surface marking as above, by the word "primer layer" and therefore said expression will be made use of as this description proceeds and in the appended claims.

This invention is principally concerned with the art of compounding, forming, applying on the road pavement and taking advantage of new and advantageous primer composite layer as hereinbelow set forth.

2. Description of the Prior Art

The art of road surface marking with tape material is a well worked one and a wide technical and patent literature thereabout exists. With relation to this art reference is herein made to the U.S. Pat. Nos. 3,399,607 and 3,587,415, of the present Applicant. As far as the machines and devices for providing a road pavement with such markings, reference is also made to the U.S. Pat. Nos. 3,007,838, 3,155,564, 3,235,436, 3,262,375 and 3,844,669, of same Applicant.

It is also known that in relatively recent years the road marking tape materials have been substantially improved by making them "non skidding", that is adapted to provide a sure frictional adherence with the vehicle's tires, such as for example described in the Applicant's U.S. Pat. No. 3,782,842. This provision, which is essential for traffic safety, has made imperative that the tape material shall be most firmly secured to the road pavement to prevent detachement and stripping of the tape off from said pavement, under the extremely severe inertial force exerted by fast and heavy vehicles such as in the event of an emergency braking, accelerations and so on.

It is further known to those skilled in the art that the entire cycle of operations required for marking a road surface involves a considerable overall time, from the moment at which the primer layer composition is laid in contact with the road pavement to that at which the same composition has been hardened and a stable and load and stress resistant layer has been formed.

Further, the presence of moisture or water content on and into the generally porous road pavement increases such time, prejudices the firm primer layer to road pavement bond and leads to serious additional problems.

It is therefore the principal object of the invention to provide a new and advantageous method for road surface marking, comprising the essential steps of forming a primer layer on preliminarily prepared pavement and laying a prefabricated marking forming tape material, the invention including solving the sharply antithetical problems of (i) to shorten as more as possible such overall time and therefore the traffic disturbance and (ii) providing the most firm and permanent binding of the tape material to the road pavement by means of a completely set and properly hardened primer layer which is intimately secured to said prepared pavement.

SUMMARY OF THE INVENTION

An essential premise of the invention consists in the analysis of the said overall time, as follows:

1st Period : from the very time at which the primer layer forming composition is caused to contact the roadway pavement surface to the time at which the laying down and pressing of the tape material on said layer have been completed.

Therefore this 1st Period comprises, apart from the pavement preparation, the steps of pouring or otherwise laying of a substantially fluidified composition on the road pavement, promoting a certain viscosity of the laid down composition into a layer, doctoring said layer to provide same with an upper smooth face, and laying and pressing the tape material on the thus formed primer layer face when said layer has attained a consistency enough to resist to said laying and pressing. It is evident that suche steps will occur, at any given location of the area to be marked, during the passage of the road-marking machine over said location.

2nd Period : from the end of said 1st Period to the time at which the marked area can be safely re-open to traffic, the term "safely" meaning herein that the sign has became such to resist, without damage, to a regular traffic, taking into consideration the type and density of traffic or the specific roadway being marked, but admitting that the freshly formed marking might be however spoiled upon the occurrence of a exceptional that is a statistically rare stress (such as an emergency braking) applied to said marking which individually forms a minor part of the entire road surface area open to traffic.

3rd Period : from the end of the 2nd Period to the time at which the primer layer has been completely set and the entire marking stratified structure has acquired its final and best status and ability of resisting to any stress to which it has been designed to resist.

The above analysis has been conceived, at its turn, upon the premise that it is not worth of keeping the traffic far from a freshly marked area for a time longer than that required for having the marking to "reasonably" resist to the statistically most common traffic stress. Other premise of the above analysis are:

a. The composition designed to contact at first the road pavement should be nearly liquid and hydrophilous for impregnating and properly "wetting" said road pavement;

b. the laying down and pressing of the tape material on the primer layer requires that the compound which forms such layer will have a viscosity not less than $10^3$ cP (centipoises) and preferably of $10^4$ cP about;

c. the opening of the marked area to traffic should occur when the primer layer will be so hardened to provide a resistance to stresses frictionally horizontally applied to the tape surface, of a least 1.5 kg/cm. This resistance is generally provided when the average viscosity of the primer layer compound is in the range from $10^5$ to $10^6$ cP;

d. the primer layer, when completely set, should provide a bond of the tape to the road pavement such to raise the above resistance up to at least 3 kg/cm or above.

A particular class of the compounds adapted for forming the primer layer comprises compounds of essentially thermoplastic nature. The term "essentially thermoplastic nature" as used herein encompasses materials, compounds and compositions which harden when cooled and whose viscosity is essentially inversely proportional to their temperature. The method according to this invention contemplate the use of compounds of such nature and having generally high content of bituminous components.

According to the invention, the method of forming a traffic regulating indicium on a road pavement comprises applying a preparatory thin layer of an essentially liquid hydrophilous agent on said pavement, and then forming thereon a primer layer by applying thereto a heated composition in flowable state which is of such a nature that the viscosity thereof increases as the temperature decreases from the temperature of application of said composition to said pavement, said composition having such a viscosity upon application thereof to said pavement that said composition intimately contacts said pavement, and said composition being capable of rapidly attaining a viscosity in the range of about $10^3$ to $10^4$ cP when said composition has a viscosity below said range upon being applied to said pavement, said composition further being capable of undergoing an increase in viscosity on said pavement from said range to a higher viscosity of at least $10^5$ cP within a period of about 30 seconds; and applying a marker tape to said primer layer when the viscosity thereof is substantially in said range to thereby preliminary bond said marker tape to said primer layer, said marker tape becoming more securely bonded to said primer layer as the viscosity of said primer layer increases from said range towards said higher viscosity.

According to a preferred embodiment of the invention, the said composition has a high viscosity at ambient temperature and comprises at least 60 percent by weight of one or more thermoplastic substances having an average melting temperature such that the viscosity of said composition is approximately in said range at the temperature of application of said composition to said pavement.

The invention will now detailedly described with reference to the accompanying drawings.

BRIEF DESCRIPTION OF THE DRAWINGS

FIG. 3 is a diagrammatical side view of an apparatus adapted for carrying out the invention;

FIG. 4 diagrammatically illustrates certain details of said apparatus;

FIG. 5 is a somewhat simplified vertical sectional view of a device, comprised in said apparatus, for fastly melting substantially amounts of thermoplastic components;

DESCRIPTION OF THE PREFERRED EMBODIMENTS

Figure 1:
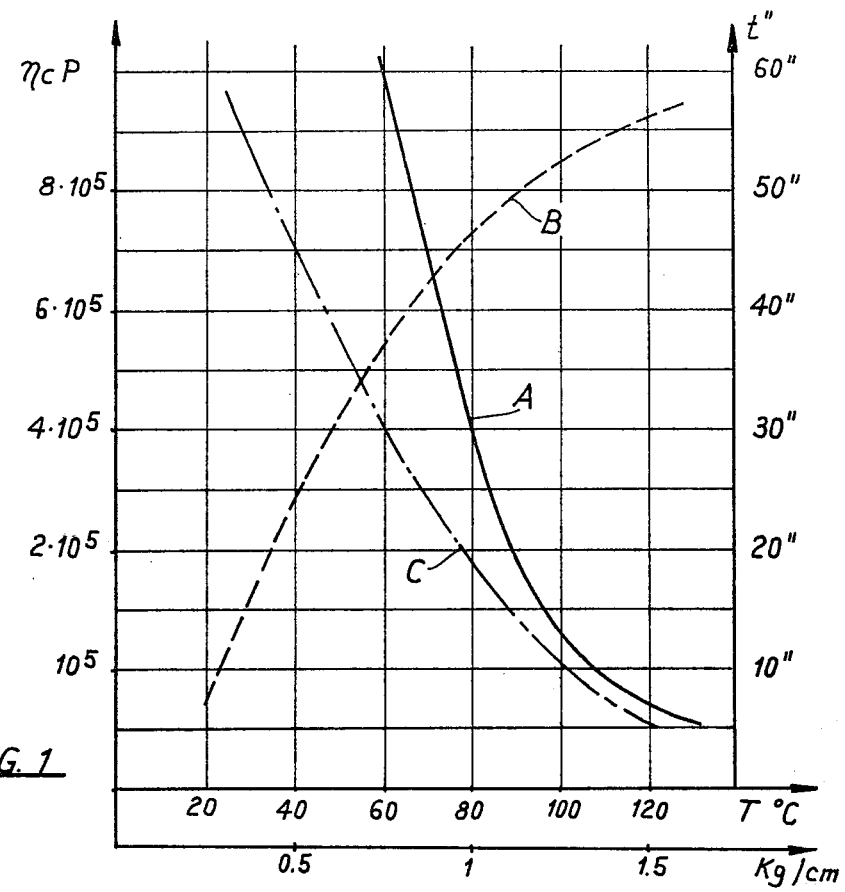
FIG. 1 is a graph representative of the viscosity versus the temperature of an essentially thermoplastic compound according to the invention.

Referring first to the graph of FIG. 1: the method comprises making use of a thermoplastic compound the viscosity $\eta_{cP}$ varies, versus the temperature T° C, according a curve of the type indicated at A. Below the abscissa along which the temperatures are indicated, the graph comprises another scale, wherein the resistances to horizontal stresses are indicated in kg/cm, versus the viscosities $\eta_{cP}$, by referring to curve B. The curve C in dot-and-dash line is referred to the scale of times $t''$, on the left side of the graph, and approximatively indicates the time, in seconds, occurring for lowering the temperature of a freshly laid primer layer to increasing its viscosity at the values indicate versus the temperature on the abscissa, on a road pavement having a temperature of 20°C about.

Said road pavement is assumed to have been preliminarily prepared, as described below, for improving the binding of said compound.

From the graph of FIG. 1 there is seen that the minimal resistance compatible with re-opening to traffic of a freshly marked area can be attained 55 second about. Such result can be however attained provided that certain critical relationship, as resulting from the graph of FIG. 2, will be satisfied. In said graph, T indicates the road pavement temperature, $T_p$ the temperature of the primer composition at the time of its first contact with the pavement, and $T_a$ the temperature of the primer layer, in the freshly formed marking, compatible with re-opening of the marked area to traffic. The critical difference $T_a$ minus $T_s$ there is also indicated in the slanting scale at right.

The area of the ternary graph is subdivided into sub-areas each identified by values and ranges of times $t$, in seconds, occurring for the necessary hardening of the layer.

Such graph, is self-explanatory. It positively proves the importance of making use of a composition which (i) has a high solidification temperature (for having a high $T_a$) and (ii) possesses a small temperature difference between the status in which the layer can be spread, doctored and coated by the tape material and the status in which its hardness is such to prevent substantial internal flowing.

As far as the preliminary preparation of the road pavement, as detailedly described below with reference to FIGS. 6 to 8, there is made use of a compound having a relatively low viscosity, such as from 100 to 1000 cP, provided with hydrophilous radicals, and therefore capable to promptly permeate and essentially porous and moist or wet structure, as the road pavements generally are, bonding itself to the water dipoles. This preparation allows to make use, for forming the substantial portions of the primer layer, of a second compound having a relatively high viscosity and having relatively low quenching temperature of at least 30° C, and therefore which can very promptly harden, and which could not by itself properly permeate the pavement surface as being essentially water-repellent.

Said preparation ensures the said permeation even if the pavement is substantially moist and water permated (thus ensuring efficient road marking in unfavourable weather) and the most desirable prompt setting and hardening of the entire primer layer.

The said hydrophilous wetting agent may comprise a solution of epoxy resins, of epoxy-urethane resins or of mixtures of epoxy and urethane resins, in compatible solvents and/or plasticizer. The hardening is ensured by well known hardeners for such resins. The hardener can be added in the solution or also in the primer compound, so that the hardening is promoted by the interfacial action occurring as soon as the said primer layer is laid and pressed.

A few Examples of compounds adapted for providing satisfying primer layers will now be described in parts by weight:

EXAMPLE 1

There is described a "monocomponent" composition, which does not require the use of "wetting" additives.

| | |
|---|---|
| Pitch (of the type commercially known as "Epoxy grade") and melting at 1150C | 20 |
| Styrene-butadiene resin or other synthetic rubber, such as for example "Pliolite S 6 F" (Goodyear) | 5 |
| Tar fractionated part for epoxy resin, such as "Epoxy tar, WHA 2" type | 5 |
| Coumarone resin (such as "Cumar P 25") | 10 |
| Phenolic colophony resin (such as "Vinsol" resin (Hercules)) | 60 |
| Oxidized bitumen | 100 |
| Bitumen 40/50 | 100 |

The above composition is advantageously spread upon a road pavement which has been preliminarily wetted by a spray of a two-component liquid composition, such as

| | | |
|---|---|---|
| "A" | Epoxy resin (such as "Araldite G 7 250") | 260 |
| | Epoxy tar | 100 |
| "B" | Catalyst for epoxy resin (such as "Ankamine XT") | 65 |
| | Epoxy tar | 115 |
| | Accelerator for epoxy resin (such as "D M P 30") | 20 |
| | Cresylic acid | 100 |

EXAMPLE 2

Figure 2:
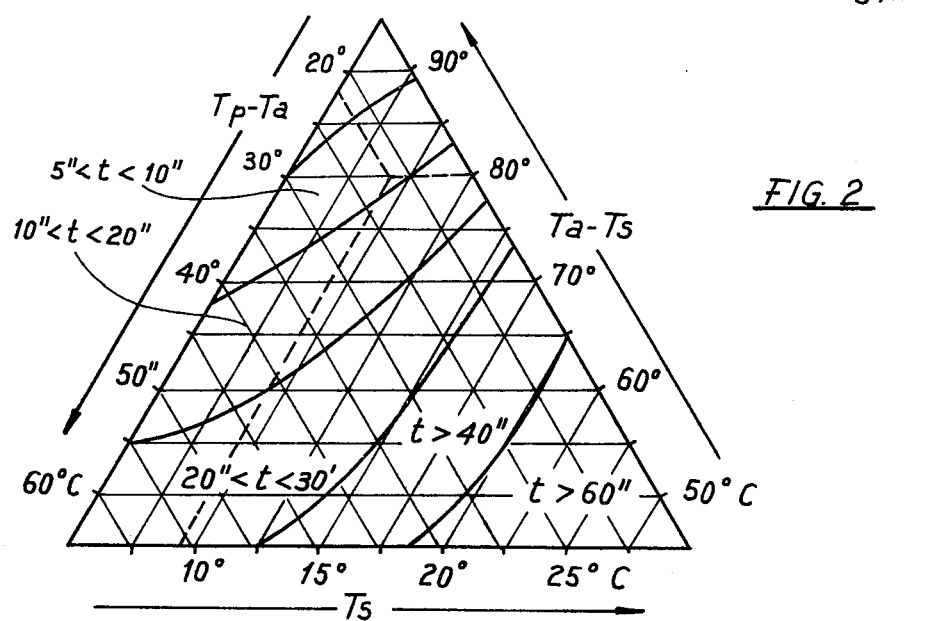
FIG. 2 is a ternary graph which indicates the times of closure to traffic of the area being marked.

This Example concerns a meltable composition including wetting polyamidic components, and adapted to provide result as indicated by the viscosity curve of the graph of FIG. 1 in the time interval 10 " – 20 " of the ternary graph of FIG. 2.

As polyamide resins there are indicated, for example those manufactured and solid by Schering, as follows

| | |
|---|---|
| "Versamid 940" | 65 |
| "Versamid 100" | 5 |

The meltable or fusible composition comprises:

| | |
|---|---|
| Vinyl-ethylene acetate copolymer (such as "Elvax 240" - DuPont) | 20 |
| Colophony ester (such as "Foral 85" -Hercules) | 10 |
| Oxidized bitumen | 100 |
| Bitumen 40/50 | 100 |

EXAMPLE 3

This Example concerns a two-component primer layer composition, comprising prevailing thermoplastic components complemented by additives adapted to provide a relatively slow cross-linking associated to a satisfyingly fast hardening of the thermoplasic part of the compound.

| | | |
|---|---|---|
| "A" | Pitch ("Epoxy grade") melting point 115° C | 20 |
| | Styrene-butadiene resin with high styrene content (such as "Pliolite S 6 F") | 5 |
| | Epoxy tar | 10 |
| | Oxidized bitumen | 20 |
| | Bitumen 120 | 20 |
| | Hydrocarbon resin (such as "Eskorez 1102") (Esso) | 10 |
| | Epoxy resin (such as "Epon 828" - Shell) | 15 |
| "B" | "Versamid 100" | 10 |
| | "Versamid 140" | 10 |
| | Oxidized bitumen | 30 |
| | Bitumen 40/50 | 40 |
| | Epoxy tar | 10 |

Components "A" and "B" are used in like parts.

Compositions as above can be advantageously made use of for forming road surface markings by means of an apparatus as shown in FIGS. 3 and 4 and preferably consisting of a primer layer and marking tape material applying vehicle generally indicated at 10 and of a supply or service vehicle generally indicated at 12.

As shown in FIG. 4 the vehicle 10 includes steering means 14, a seat 16 for the operator, and a motor 18 and a pouring device 20 for pouring the molten thermoplastic composition, and spraying devices located forward and rearward of means 20 for spraying the liquid wetting and thermosetting additives. The molten material is supplied to said device 20 through a pipe 26 by a melting unit 28, and further pipes 30 (FIG. 4) are provided for supplying the liquid additives.

The marking tape material 32 is also supplied by the supply vehicle 12, as unwound from one bobbin 34.

For taking into account the relative movements of the two vehicles, elbows 36 are provided along the said pipes, and oscillatable braces 38 are provided for guidedly supporting the tape 32.

The melting unit 28 preferably comprises, as shown in FIG. 5, a plurality of two-walled blades 40 each having an upwardly turned cutting wedge portion and enclosed into a container 42. Blocks of solid thermoplastic compound are located above said blades 40 and a pressing concave plate 44, preferably actuated by a ram 46 is actuated for urging said blocks against and between the blades, as far as such block have been plasticized upon contact with the blades surfaces. Said blades are heated by circulating thereinto a heated diathermic oil, by means of ducts 48 and a pump 50. The oil is heated into a tubular boiler 52, the burner 54 of which is fed with liquid or gas fuel. The same burner heats also an enclosure 56 wherein the molten compounds is collected and stored while being circulated through ducts 58 and a pump 60, ready for being supplied to the machine 10 for its application to the road pavement.

Figure 6:
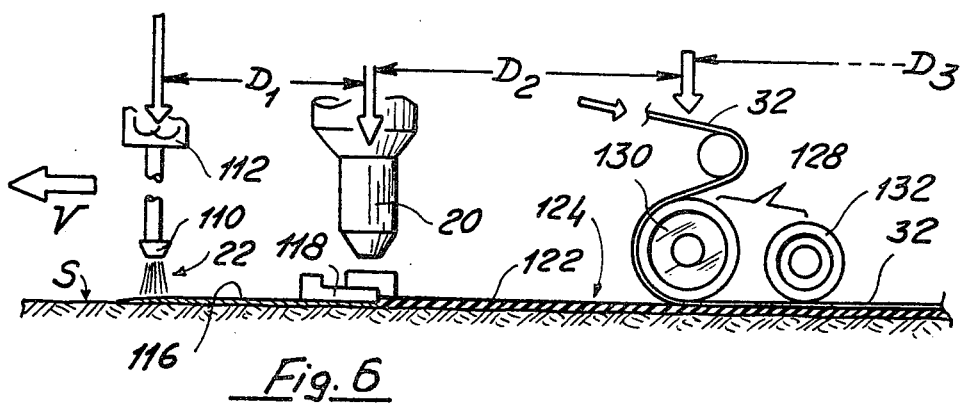
FIG. 6 diagrammatically illustrates the combination of the various devices included in the apparatus for providing the complete process of preparing the road pavement and of forming the traffic regulating indicium thereon.

As more specifically illustrated in FIG. 6, there is assumed that the vehicle (or vehicle system) moves in the direction and at a given speed indicated at V, on a road pavement surface S, and that such surface had been essentially cleaned (such as by a rotary brush, not shown) and dried (such as by means of a pressurized air or stream blast and/or by flames, not shown).

The procedure implies processing the pavement with a set for subsequently acting means, namely: a spray jet 110 supplied a metering pump 112 for applying at 22 the thin layer 116 of the wetting hydrophilous compound on said surface S, primer compound metering and doctoring means 118 of the relatively highly viscous and generally thermoplastic compound, supplied by the above said pouring device 20, to form the desired primer layer 122 on the prepared pavement surface S, and a tape applying and pressure roller system 128, preferably including an applying roller 130 and a pressure complementing roller 132. Additional spray means (not shown) can be arranged between means 118 and 130 for providing the surface 124 of the primer layer with additional liquid agents for improving the bond of the tape 32 on said latter surface.

The intervals $D_1$ and $D_2$ are selected as a function of the speed V for providing the times occurring for preliminary impregnation of the pavement surface and respectively for the setting of the primer layer 122 at the viscosity suitable for tape application and pressure. The following interval $D_3$ indicating that after which the marked road area can be re-opened to traffic, as above described.

Figure 7:
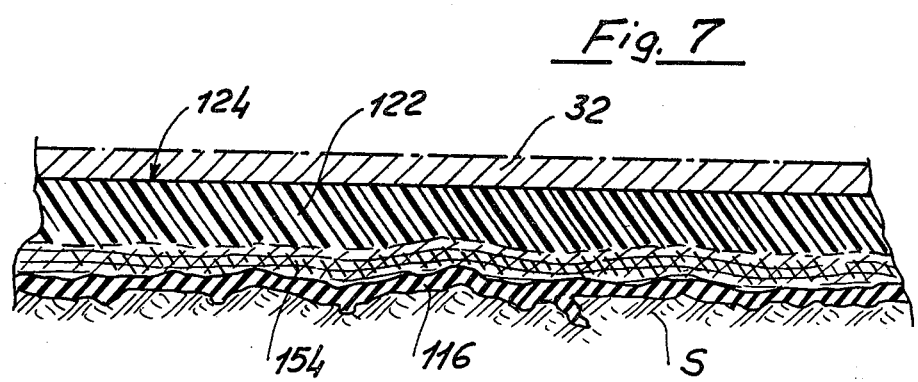
FIG. 7 is a fragmentary diagrammatical vertical longitudinal sectional view which illustrates, in greatly enlarged scale, the indicium as laid on and secured to a road pavement.
Figure 8:
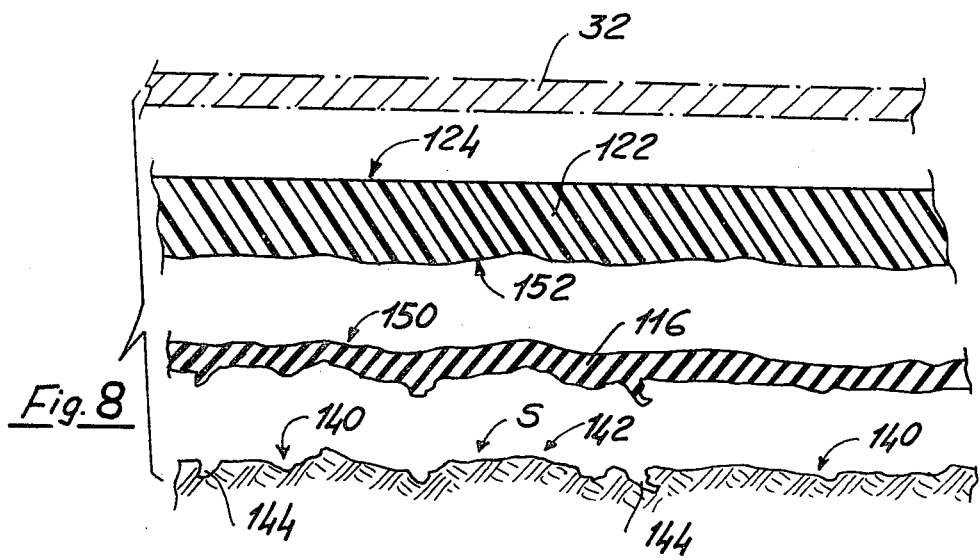
FIG. 8 is a similarly illustrated exploded view of the indicium of FIG. 7.

FIGS. 7 and 8 visualize the arrangement and the interactions of the thus superimposed layers. The surface S of the road pavement, generally consisting of gravel-bitumen or asphalt conglomerate, comprises hollows 140 and protuberances 142 and generally deeper pores (such as indicated at 144 in FIG. 8) wherein water or atmospheric moisture is enclosed and coming from the terrain and maintained by capillarity action. The first and thin layer 116 of the liquid hydrophilous agent is capable of promptly permeate and surface S and the adjacent understrata.

The subsequent applying, doctoring and pressing of the essentially viscous, impervious and water-repellent primer layer 122 (the composition of which is however compatible with that of the preparatory layer 116 and compenetrates and bonds at the interfaces 150–152 thereof) provides, nearly immediately after the contact of face 152 on face 150 an interfacial interstrate as indicated at 154 on FIG. 7, whereby the said primer layer 122 result promptly and firmly secured to and also promptly harden above the pavement surface S, according to the objects of the invention.

I claim:

1. A method for producing an indicium on a porous pavement without requiring preliminary heating and drying of the pores of the pavement, comprising the steps of applying a thin layer of a liquid hydrophilic agent to the pavement for permeation of the same by said agent; applying over said hydrophilic layer a heated primer layer which is in a flowable state and at a viscosity which is too high to allow the primer layer itself to penetrate the pavement, the hydrophilic layer promoting the bonding of said primer layer to the pavement without requiring preliminary heating and drying of the pores of the pavement and the primer layer undergoing an increase in its viscosity subsequent to application over said hydrophilic layer; and applying a marker tape over said primer layer when the viscosity thereof has increased, so that said marker tape becomes bonded to said primer layer.

2. A method as defined in claim 1, said step of applying a heated primer layer being performed with a composition which forms the primer layer and which is capable of rapidly attaining a viscosity within the range of $10^3$ to $10^4$ cP after said step of applying said primer layer and attaining an increased viscosity of at least $10^5$ cP within about 30 seconds after said step of applying said primer layer, wherein said step of applying a marker tape over said primer layer is performed while the viscosity of said primer layer is substantially within the range of $10^3$ to $10^4$ cP so as to thereby preliminarily bond said marker tape to said primer layer, said bonding becoming increasingly secured as the viscosity of said primer layer increases towards the increased viscosity of at least $10^5$ cp.

3. The method of claim 1, wherein said primer layer forming a bond with said tape at a viscosity above about $10^5$ cP which is capable of resisting a horizontally applied stress of 1.5 kg/cm$^2$; and wherein said composition is capable of further hardening to a condition such that the bond between said primer layer and said tape is able to withstand a horizontally applied stress of at least 3 kg/cm$^2$.

4. The method of claim 1, wherein said marker tape is pressed into said primer layer.

5. The method of claim 1, wherein said composition comprises a bituminous component.

6. The method of claim 1, wherein the viscosity of said composition is approximately inversely proportional to the temperature thereof.

7. The method of claim 1, wherein said composition has a high viscosity at ambient temperature and comprises at least 60 percent by weight of one or more thermoplastic substances having an average melting temperature such that the viscosity of said composition is approximately in said range at the temperature of application of said composition to said pavement.

8. The method of claim 7, wherein said composition is applied after surface porosity impregnation by the said hydrophilous wetting agent.

9. The method of claim 8, wherein said hydrophilous wetting agent comprises a member of the group consisting of hydroxy, epoxy and isocyanic radicals.

10. An arrangement for producing an indicium on a pavement, comprising in combination, means for accommodating a composition which is suitable when melted for being layered onto the pavement; means extending within said accommodating means for melting said composition, said melting means comprising a plurality of spaced, hollow and double-walled blades, means for heating a fluid carrier, and means for circulating said fluid heat carrier through said hollow, double-walled blades so as to heat the surfaces of said blades to a temperature which is above the melting point of said composition; means for urging said composition against the heated surfaces of said blades so as to thereby melt said composition; means for applying said melted composition to the pavement; and means for applying a thin layer of a substantially liquid hydrophilic agent, wherein said melted composition applying means is operative for applying said melted composition over said thin layer of hydrophilic agent.

* * * * *